(12) United States Patent
Austin et al.

(10) Patent No.: US 9,779,480 B2
(45) Date of Patent: Oct. 3, 2017

(54) VIEW-DRIVEN CONSUMPTION OF FRAMELESS MEDIA

(71) Applicant: Google Technology Holdings LLC, Mountain View, CA (US)

(72) Inventors: Darren Mark Austin, San Jose, CA (US); Baback Elmieh, Palo Alto, CA (US); Douglas Paul Sweetland, Los Angeles, CA (US); Brian M. Collins, South San Francisco, CA (US); Jan J. Pinkava, Portland, OR (US)

(73) Assignee: Google Technology Holdings LLC, Mountain View, CA (US)

( * ) Notice: Subject to any disclaimer, the term of this patent is extended or adjusted under 35 U.S.C. 154(b) by 510 days.

(21) Appl. No.: 14/335,833

(22) Filed: Jul. 18, 2014

(65) Prior Publication Data

US 2015/0022557 A1    Jan. 22, 2015

Related U.S. Application Data

(60) Provisional application No. 61/856,447, filed on Jul. 19, 2013.

(51) Int. Cl.
| | | |
|---|---|---|
| *G09G 5/00* | (2006.01) | |
| *G06T 3/60* | (2006.01) | |
| *H04N 5/232* | (2006.01) | |
| *H04N 21/218* | (2011.01) | |
| *H04N 21/414* | (2011.01) | |
| *H04N 21/4725* | (2011.01) | |
| *H04N 21/4728* | (2011.01) | |
| *H04N 21/81* | (2011.01) | |
| *H04N 21/8541* | (2011.01) | |

(52) U.S. Cl.
CPC ........... *G06T 3/60* (2013.01); *H04N 5/23238* (2013.01); *H04N 21/21805* (2013.01); *H04N 21/41407* (2013.01); *H04N 21/4725* (2013.01); *H04N 21/4728* (2013.01); *H04N 21/816* (2013.01); *H04N 21/8541* (2013.01)

(58) Field of Classification Search
CPC ....................................................... G06T 3/60
USPC ....................................................... 345/649
See application file for complete search history.

(56) References Cited

U.S. PATENT DOCUMENTS

| | | |
|---|---|---|
| 5,607,356 A | 3/1997 | Schwartz |
| 5,892,507 A | 4/1999 | Moorby et al. |

(Continued)

FOREIGN PATENT DOCUMENTS

| | | |
|---|---|---|
| EP | 1087618 | 3/2001 |
| EP | 2209306 | 7/2010 |
| WO | WO-2006056311 | 6/2006 |

OTHER PUBLICATIONS

"International Search Report and Written Opinion", Application No. PCT/US2014/046907, Nov. 6, 2014, 11 Pages.

(Continued)

*Primary Examiner* — Jason Olson
(74) *Attorney, Agent, or Firm* — Colby Nipper

(57) ABSTRACT

This document describes techniques and apparatuses enabling view-driven consumption of frameless media. These techniques and apparatuses provide frameless media and enable a user to engage with the frameless media by orienting a viewing device within the world created by that frameless media. This orienting by the user drives what the user sees in this world and when the user sees it.

20 Claims, 7 Drawing Sheets

(56) References Cited

U.S. PATENT DOCUMENTS

| | | | |
|---|---|---|---|
| 6,714,909 | B1 | 3/2004 | Gibbon et al. |
| 7,184,574 | B1 | 2/2007 | Zahavi |
| 7,467,218 | B2 | 12/2008 | Gould et al. |
| 7,860,309 | B1 | 12/2010 | Bodnar et al. |
| 7,904,812 | B2 | 3/2011 | Atlas et al. |
| 9,086,724 | B2* | 7/2015 | Sakaguchi ............... G06F 3/01 |
| 9,087,403 | B2* | 7/2015 | Keating ............... G06T 19/006 |
| 9,183,560 | B2 | 11/2015 | Abelow |
| 9,589,597 | B2 | 3/2017 | Austin et al. |
| 9,607,424 | B2 | 3/2017 | Ng et al. |
| 2003/0145331 | A1 | 7/2003 | Escobar et al. |
| 2003/0232318 | A1 | 12/2003 | Altenhofen et al. |
| 2004/0021668 | A1 | 2/2004 | Chevallier et al. |
| 2005/0025465 | A1 | 2/2005 | Danieli |
| 2006/0256133 | A1 | 11/2006 | Rosenberg |
| 2007/0028270 | A1 | 2/2007 | Ostojic |
| 2007/0061862 | A1 | 3/2007 | Berger et al. |
| 2008/0005669 | A1 | 1/2008 | Eilertsen et al. |
| 2008/0215172 | A1 | 9/2008 | Digon |
| 2008/0267451 | A1 | 10/2008 | Karazi |
| 2009/0113278 | A1 | 4/2009 | Denoue et al. |
| 2009/0181736 | A1 | 7/2009 | Haigh-Hutchinson et al. |
| 2009/0198719 | A1 | 8/2009 | DeWitt |
| 2009/0201313 | A1 | 8/2009 | Thorn |
| 2009/0219411 | A1 | 9/2009 | Marman et al. |
| 2009/0249404 | A1 | 10/2009 | Chen |
| 2009/0325660 | A1 | 12/2009 | Langridge |
| 2010/0153520 | A1 | 6/2010 | Daun et al. |
| 2010/0157064 | A1 | 6/2010 | Cheng et al. |
| 2010/0174421 | A1 | 7/2010 | Tsai et al. |
| 2010/0208138 | A1 | 8/2010 | Mohri et al. |
| 2010/0251101 | A1* | 9/2010 | Haussecker ............. G06T 17/05 715/243 |
| 2011/0126106 | A1 | 5/2011 | Ben Shaul et al. |
| 2011/0299832 | A1 | 12/2011 | Butcher |
| 2011/0304627 | A1 | 12/2011 | Kegel et al. |
| 2012/0092348 | A1* | 4/2012 | McCutchen ............. G06T 3/00 345/474 |
| 2012/0105473 | A1 | 5/2012 | Bar-Zeev et al. |
| 2012/0169882 | A1 | 7/2012 | Millar et al. |
| 2012/0249424 | A1 | 10/2012 | Bove et al. |
| 2014/0002580 | A1* | 1/2014 | Bear ...................... H04N 5/445 348/14.07 |
| 2014/0133834 | A1 | 5/2014 | Shannon |
| 2014/0282013 | A1 | 9/2014 | Amijee |
| 2015/0012827 | A1* | 1/2015 | Elmeih ............... G06F 3/04842 715/719 |
| 2015/0023650 | A1 | 1/2015 | Austin et al. |
| 2015/0026576 | A1 | 1/2015 | Elmieh et al. |
| 2015/0042795 | A1 | 2/2015 | Tsuria et al. |
| 2016/0026344 | A1 | 1/2016 | Elmieh |
| 2016/0054863 | A1 | 2/2016 | Elmieh et al. |

OTHER PUBLICATIONS

"International Search Report and Written Opinion", Application No. PCT/US2014/047302, Jan. 22, 2015, 13 Pages.

"International Search Report and Written Opinion", Application No. PCT/US2014/047269, Nov. 10, 2014, 13 pages.

Heymann, et al., "Representation, Coding and Interactive Rendering of High-Resolution Panoramic Images and Video Using MPEG-4", Panoramic Photogrammetry Workshop, Berlin, Germany, Feb. 28, 2005, 5 Pages.

Kwiatek "360 degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.

"International Preliminary Report on Patentability", Application No. PCT/US2014/046907, Jan. 19, 2016, 8 pages.

"International Preliminary Report on Patentability", Application No. PCT/US2014/047302, Jan. 19, 2016, 8 pages.

"International Preliminary Report on Patentability", Application No. PCT/US2014/047269, Jan. 19, 2016, 9 pages.

"International Search Report and Written Opinion", Application No. PCT/US2015/041339, Oct. 30, 2015, 13 pages.

"Restriction Requirement", U.S. Appl. No. 14/335,821, Nov. 4, 2015, 5 pages.

"SightLine: The Chair—Virtual Surreality", Retrieved from: http://sightlinevr.com/index.html on Nov. 30, 2015, 2 pages.

"Non-Final Office Action", U.S. Appl. No. 14/209,432, Mar. 10, 2016, 21 pages.

"Non-Final Office Action", U.S. Appl. No. 14/335,821, Feb. 25, 2016, 9 pages.

"Final Office Action", U.S. Appl. No. 14/209,432, Jul. 7, 2016, 18 pages.

"Non-Final Office Action", U.S. Appl. No. 14/333,387, Jul. 28, 2016, 18 pages.

"Corrected Notice of Allowance", U.S. Appl. No. 14/335,821, Jan. 12, 2017, 2 pages.

"Final Office Action", U.S. Appl. No. 14/333,387, Feb. 27, 2017, 16 pages.

"First Action Interview Office Action", U.S. Appl. No. 14/526,311, Mar. 9, 2017, 3 pages.

"Foreign Office Action", EP Application No. 14752459.9, Mar. 6, 2017, 8 pages.

"International Preliminary Report on Patentability", Application No. PCT/US2015/041339, Feb. 2, 2017, 10 pages.

"Pre-Interview Communication", U.S. Appl. No. 14/526,311, Feb. 10, 2017, 7 pages.

"Non-Final Office Action", U.S. Appl. No. 14/513,761, Oct. 4, 2016, 12 pages.

"Non-Final Office Action", U.S. Appl. No. 14/209,432, Dec. 7, 2016, 22 pages.

"Notice of Allowance", U.S. Appl. No. 14/35,821, Oct. 25, 2016, 5 pages.

"Final Office Action", U.S. Appl. No. 14/513,761, dated May 3, 2017, 13 pages.

"Notice of Allowance", U.S. Appl. No. 14/333,387, dated May 4, 2017, 9 pages.

"Final Office Action", U.S. Appl. No. 14/209,432, dated Jun. 16, 2017, 23 pages.

* cited by examiner

VIEW-DRIVEN CONSUMPTION OF FRAMELESS MEDIA

PRIORITY APPLICATION

This application claims priority under 35 U.S.C. §119(e) to U.S. Provisional Patent Application No. 61/856,447, entitled "View-Driven Consumption of Frameless Media" and filed on Jul. 19, 2013, the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Conventional media, such as movies, television, and music videos, are framed. When users watch this media they are viewing media within a frame, which interferes with users' desire to be in the world that media programs are often attempting to create. A movie, at its best, can draw in viewers, suspending disbelief and engaging the viewer as if the viewer is actually in the world created by that movie. The ability of the movie to create this world, however, is limited by its frame.

To address this limitation some techniques have increased the size of movie screens. IMAX movie screens, for example, are so large that a viewer sitting in the theater has a reduced sense that the movie resides within a frame. Nonetheless, the frame is there and limits even IMAX moviegoers.

BRIEF DESCRIPTION OF THE DRAWINGS

Techniques and apparatuses for view-driven consumption of frameless media are described with reference to the following drawings. The same numbers are used throughout the drawings to reference like features and components.

DETAILED DESCRIPTION

Overview

Figure 1:
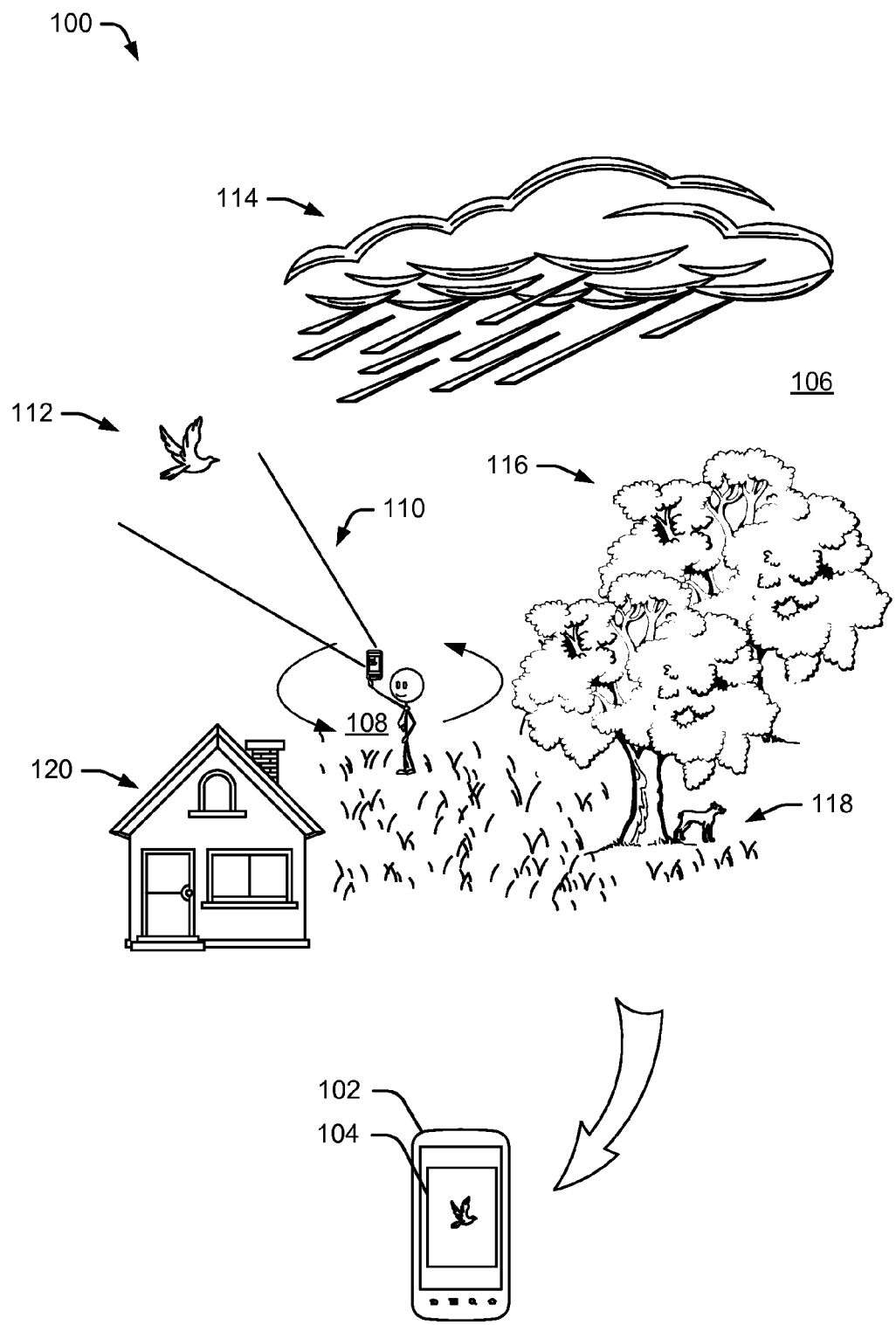
FIG. 1 illustrates an example environment in which techniques for view-driven consumption of frameless media can be implemented.

This document describes techniques and apparatuses enabling view-driven consumption of frameless media. These techniques and apparatuses provide frameless media and enable a user to engage with the frameless media by orienting a viewing device within the world created by that frameless media. This orienting by the user drives what the user sees in this world and when the user sees it.

As noted in the background above, movies and other media are limited by being presented within a frame, whether that frame is the edge of a movie screen, television screen, or computer display. Conventional manners of addressing this limitation include larger screens, which are not practical in most situations, as an IMAX movie screen cannot be reproduced in homes or on mobile devices.

Some alternative manners of addressing this limitation involve video games. Game designers attempt to address a user's desire to engage with a media world by creating first-person video games. These video games provide entertainment that can be mostly free of a frame, such as first-person shooter games (e.g., Doom and Halo), first-person simulation games (e.g., Flight Simulator), and first-person puzzle games (e.g., Myst). These video games, however, fail to tell a story—in effect they are toys, not movies. Most people are engaged by movies and television programs, often through careful and creative storytelling, convincing characters, and realistic sets. This type of engagement is simply not possible with a video game—when people want to be drawn into a movie's world most people do not want to create the story being told through game-algorithm interactions, they instead want to be told that story.

The techniques described in this document enable a user to enjoy frameless media, such as a panoramic movie, while being able to view all of the panorama without being limited by a frame. Assume, for example, that the creators of the animated motion picture Toy Story create a frameless version of this movie. For this frameless version, assume that the techniques enable a user to view Andy's room, in which Woody and the other characters live, not just from one perspective, but instead as if the user is standing in the room. The user can see all around himself or herself, including Woody, Buzz, Andy's bookcase, the dog, and minor characters all by orienting his or her display. The user can feel as if he or she is fully engaged with the entire set and scene, rather than a frame showing just some of the world created by Toy Story.

In some embodiments, the techniques enable users not to miss the frameless media's storyline when viewing images that do not include elements associated with the storyline. Thus, a user may orient his or her display to look up at Andy's ceiling, left to view Andy's window, and so forth. If these images don't include elements of the storyline—like Woody and Buzz—the techniques may pause images having these elements, or repeat images of the movie in a loop. By so doing, the user can enjoy the world without having to keep track of storyline elements or rewind the movie to follow the story.

This is but one example of the many ways in which the techniques enable view-driven consumption of frameless media. The following discussion turns to an operating environment, techniques that may be employed in the operating environment, and a device in which component(s) of the operating environment can be embodied. In the discussion below, reference is made to the operating environment by way of example only.

Example Environment

FIG. 1 illustrates an example environment 100 that is operable to employ techniques described herein. Environment 100 includes a mobile media-consumption device 102 (mobile device 102) having a mobile display 104 on which portions of frameless media 106 are presented.

Frameless media 106 is capable of telling a story and providing context for that story, though some context within frameless media 106 can be unrelated to the story. Frameless media 106 can be a panoramic having no frame and enabling 360-degree viewing in the horizontal direction, a sphere enabling 360-degree viewing, in both the horizontal direction and the vertical direction, or something in-between, such as a chopped-bottom sphere having 270-degrees in the vertical direction. Alternately or additionally, frameless media 106 may be a set of panoramic images or a composite of any number of images. Frameless media 106 can include various forms of media, such as movies, television programs, and animated short stories, though in each case these media are created or adapted to having no frame in at least one direction.

Each story told through frameless media 106 is an authored series of events previously written by a storyteller (e.g., a human writer) and presentable in a moving visual form. These stories can be represented as a storyline having a sequential series of story events that can then be represented visually by storyline image elements, which is described in detail below. Stories include, for example, Leo Tolstoy's novel War and Peace, Orson Welles's film Citizen Kane, and the computer-animated movie Toy Story by John Lasseter, Pete Docter, Andrew Stanton, and Joe Ranft. For these example stories, frameless media 106 may include a theatrical production of War and Peace that films from a center or near a center of the stage and capturing images surrounding the center of the stage, a live-action reproduction of Citizen Kane from multiple camera angles and composited together in a seamless panorama (or with panoramic digital cameras), or an adaption of Toy Story to a cylindrical or spherical animation form.

Which portions of frameless media 106 are presented on mobile display 104 depend on orientations of mobile display 104 by a user of mobile device 102. An example of such an orientation is shown in FIG. 1. User 108 is shown standing in a field surrounded in all directions by various elements. These elements are part of frameless media 106, all of which can be viewed depending on the orientation chosen by user 108. Here orientation 110 is selected effective to view bird 112, though user 108 may orient mobile device 102 instead to view storm cloud 114, trees 116, dog 118, or house 120.

Figure 2:
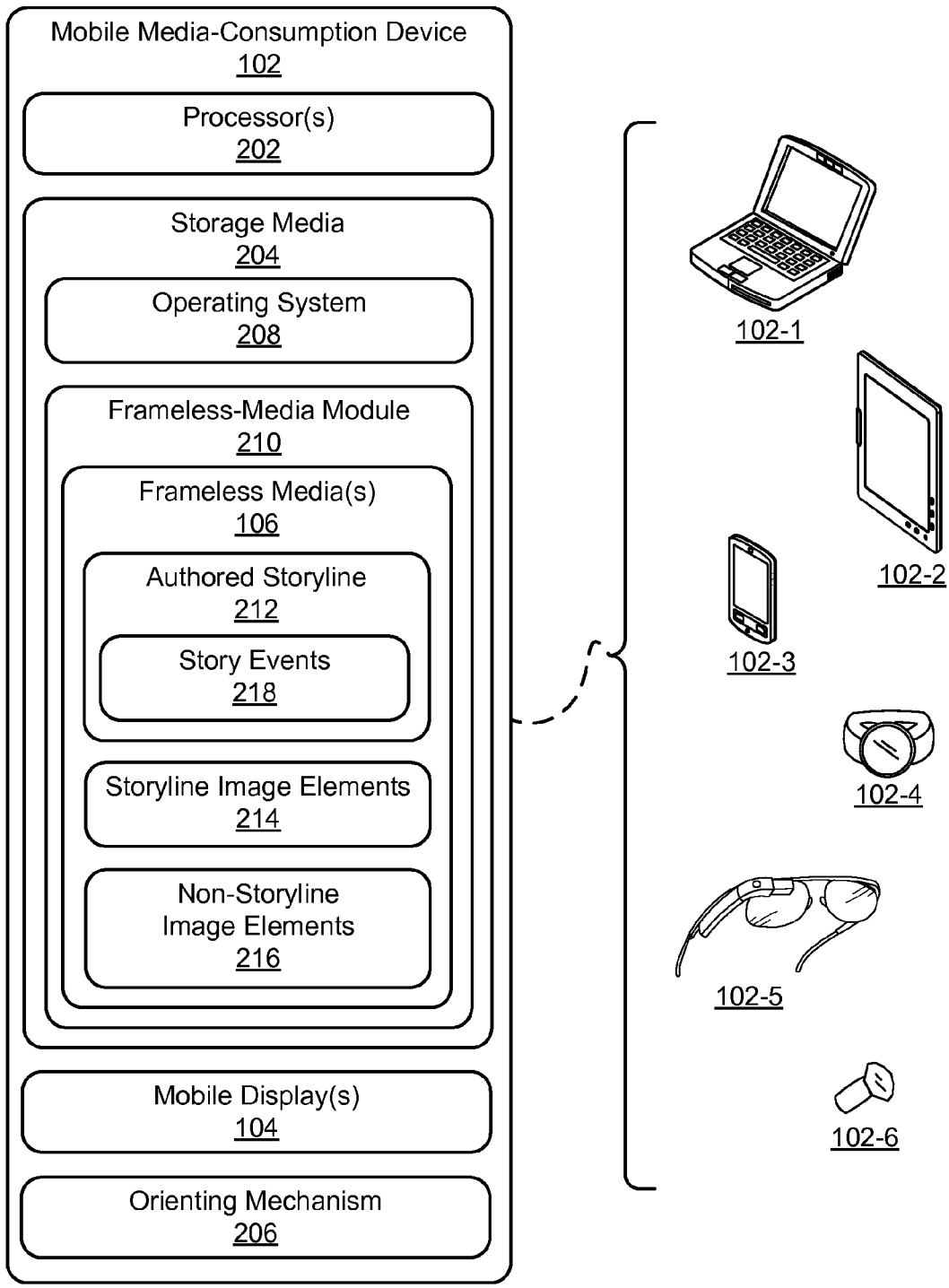
FIG. 2 illustrates an example embodiment of the mobile media-consumption device of FIG. 1.

More specifically, consider FIG. 2, which illustrates an example embodiment of mobile media-consumption device 102 of FIG. 1. Mobile device 102 is illustrated with six example devices: a laptop computer 102-1, a tablet computer 102-2, a smart phone 102-3, a media-consumption watch 102-4, media-consumption eyewear 102-5, and a media-consumption ring 102-6, though other media-consumption devices and systems, such as a personal media player, a digital camera, and a personal navigation device are contemplated.

Mobile device 102 includes or has access to computer processor(s) 202, computer-readable storage media 204 (storage media 204), one or more displays 104, and orienting mechanism 206. Storage media 204 includes an operating system 208 and frameless-media module 210. Although not shown, storage media 204 may also include applications and user data, such as digital images, audio files, or documents.

Orienting mechanism 206 is capable of sensing a user's view selections through various input manners and devices, which range from buttons, capacitive sensors, motion sensors (e.g., accelerometers or micro-electrical-mechanical systems (MEMS)), and touch screens to orientation sensors (e.g., cameras or accelerometers) capable of determining an orientation or orientation change of mobile display 104.

Orientation sensors can determine selections that tilt, turn, move in, move out, move up, move left, move right, and move down mobile display 104, to name just a few. Orientations sensors, in some cases, include micromachined accelerometers. These micromachined accelerometers, depending on the types, are configured to measure in multiple axes magnitude and direction of proper acceleration (e.g., G-force) as a vector quantity. By so doing, the micromachined accelerometers can sense orientation, coordinate acceleration, vibration, shock, and falling. For use as orientation sensors, these micromachined accelerometers can sense six degrees of freedom of mobile device 102, including three degrees of freedom in translation (X, Y, and Z) and three in rotation (pitch, yaw, and roll). Cameras can also or instead be used to track a device's location, such as relative to a user viewing the display, through tracking known objects (e.g., a book pictured by the camera can be used to determine, based on the book changing size or location in an image captured by the camera, an orientation or location in three dimensions of the display) or objects that relate to the viewer, such as by tracking a user's facial features (e.g., eyes, cornea, irises). Orienting a mobile display can be as intuitive as a user turning his or her head or eyes when wearing media-consumption eyewear 102-5 or more manually intensive, such as moving a laptop up and down and side to side.

Furthermore, user's view selections received through these various input manners can be mapped to a particular desired view. For example, if a user moves a display away from herself, this movement can be sensed by an accelerometer or camera of orienting mechanism 206, and sensor data from the accelerometer or camera passed directly to frameless-media module 210 or view processed by orienting mechanism 206 to analyze the sensor data to determine that the display is being moved away from the user. This determination can map to desired views, such as a zooming in or out of the currently viewed content. Other examples include selecting a right button or touch control, which is then sensed by (or passed to as selection data to) orienting mechanism 206, which in turn determines that display 104 has moved right relative to content being displayed. This determination can be passed to frameless-media module 210, which then presents a different view (to the right of the prior view) of visual experience 106.

Frameless-media module 210 includes or has access to one or more frameless medias 106, each of which may include an authored storyline 212, storyline image elements 214, and non-storyline image elements 216. Frameless-media module 210 is capable of presenting frameless media 106, receiving view selections or orientations, and progressing or halting progress of a story based on whether or not the images selected show events of the story. Frameless-media module 210 may receive orientations and present images in real time and seamlessly, thereby presenting a frameless-media environment that engages viewers. If computer processor(s) 202 are adequately fast at handling video rendering, as is more and more often the case even with mobile devices through faster graphical processing units (GPUs), frameless-media module 210 may present images smoothly and quickly. Frameless-media module 210 may receive and provide images so smoothly and quickly that users are seamlessly integrated into the world created by the frameless media.

Authored storyline 212 includes an authored series of story events 218 that, when presented in the authored series, tell a story. Story events 218 can be authored by one or many human authors, alone or with computer assistance. Further, story events 218 can be of a fixed order and/or number, though each may vary in an amount of time to present each event. A fast-moving music video, for example, may present new scenes and actions in less than one second. A three-hour drama, however, may have few scene changes and long stretches of dialog, which can therefore include events that may be many minutes long. Story events 218 can be part of respective sets of events making up scenes or acts, which an author may arrange such that the techniques, when returning to an incomplete event, repeat sets of events, though this is not required.

Storyline image elements 214 present at least a portion of one of story events 218 (e.g., scene or clip), which can be previously determined to enable a key element of the event to be seen or a substantial portion of the event to be seen. Non-storyline image elements 216 are images that do not present the substantial portion or key element of a story event. Previous determination of which images are or are not storyline image elements 214 is not required, as frameless-media module 210, in some cases, can determine which images, or elements shown therein, present story events 218 of authored storyline 212.

Figure 3:
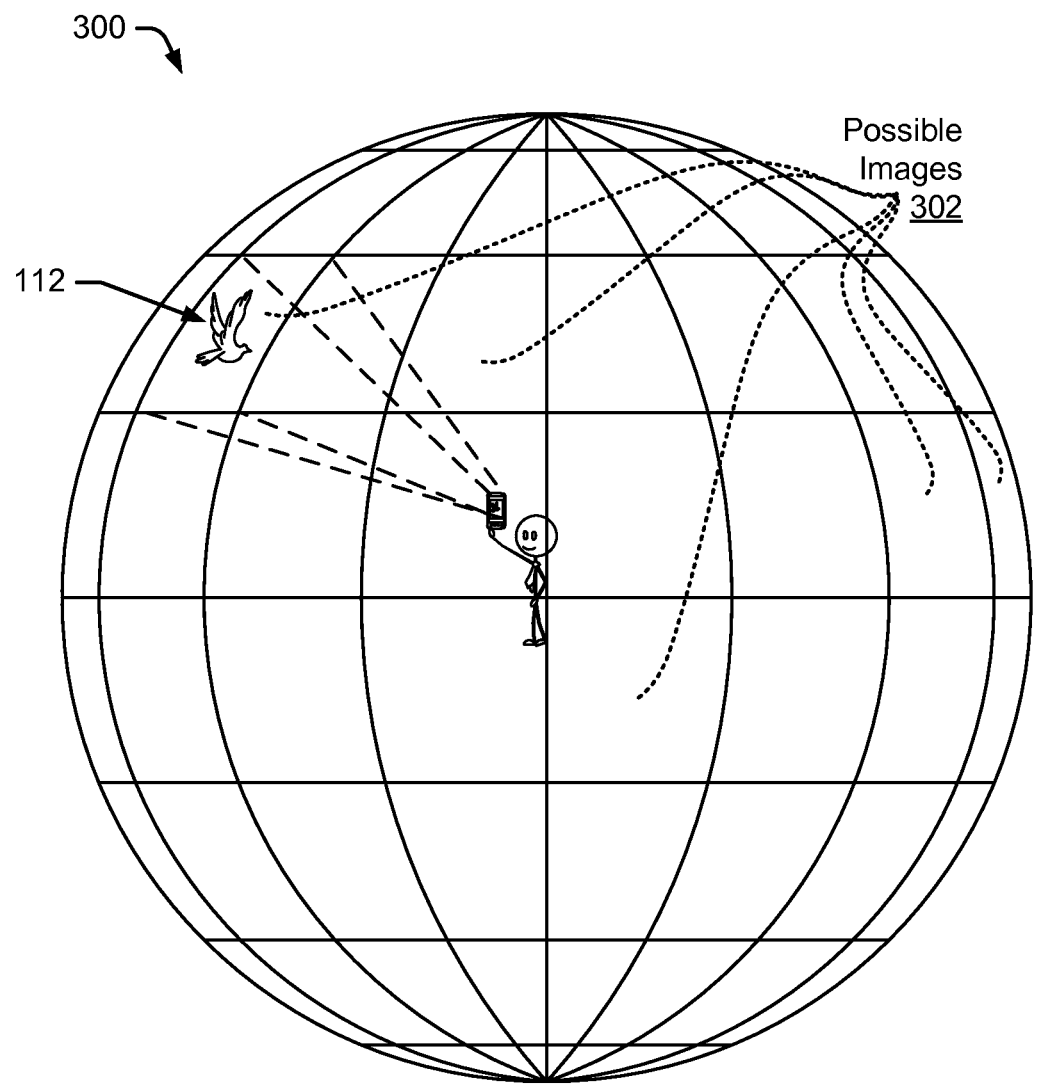
FIG. 3 illustrates a spherical media environment having a set of possible images for an instant of frameless media.

To illustrate an example of a story event and storyline image element, consider FIG. 3, which illustrates a spherical media environment 300 having a set of possible images 302 for an instant of frameless media 106. This illustrates that a perspective of images shown on mobile display 104 can look onto the interior of spherical media environment 300, which puts a media viewer within the world created by the media. Although shown as spherical, the media environment may be contoured to any suitable three-dimensional surface, space, shape, or section thereof.

Each of possible images 302 includes a section of spherical media environment 300, though for visual clarity various sections for the back of the sphere are not shown. Further, the number of possible images 302 is much larger than the sections shown, as images may overlap each of these sections down to a single pixel of resolution. These possible images 302 are therefore a simplification for purposes of explanation. For visual clarity only one visual element of frameless media 106 of FIG. 1 is shown, that of bird 112. While not required, note that user 108 is proximate a center of spherical media environment 300.

With the limitations of this illustration explained, note that one of possible images 302 includes bird 112. If bird 112 is determined, or is assigned by frameless media 106, to be story event for this instant of frameless media 106, then this possible image showing bird 112 is a storyline image element. If not, this image is a non-storyline image element.

Methods

The following discussion describes techniques enabling view-driven consumption of frameless media. These techniques can be implemented utilizing the previously described environment, such as mobile display 104, orienting mechanism 206, and frameless-media module 210 of FIG. 2. These techniques include example methods illustrated in FIG. 4, which is shown as operations performed by one or more entities. The orders in which operations of these methods are shown and/or described are not intended to be construed as a limitation, and any number or combination of the described method operations can be combined in any order to implement a method, or an alternate method, including any of those illustrated by FIG. 4.

Figure 4:
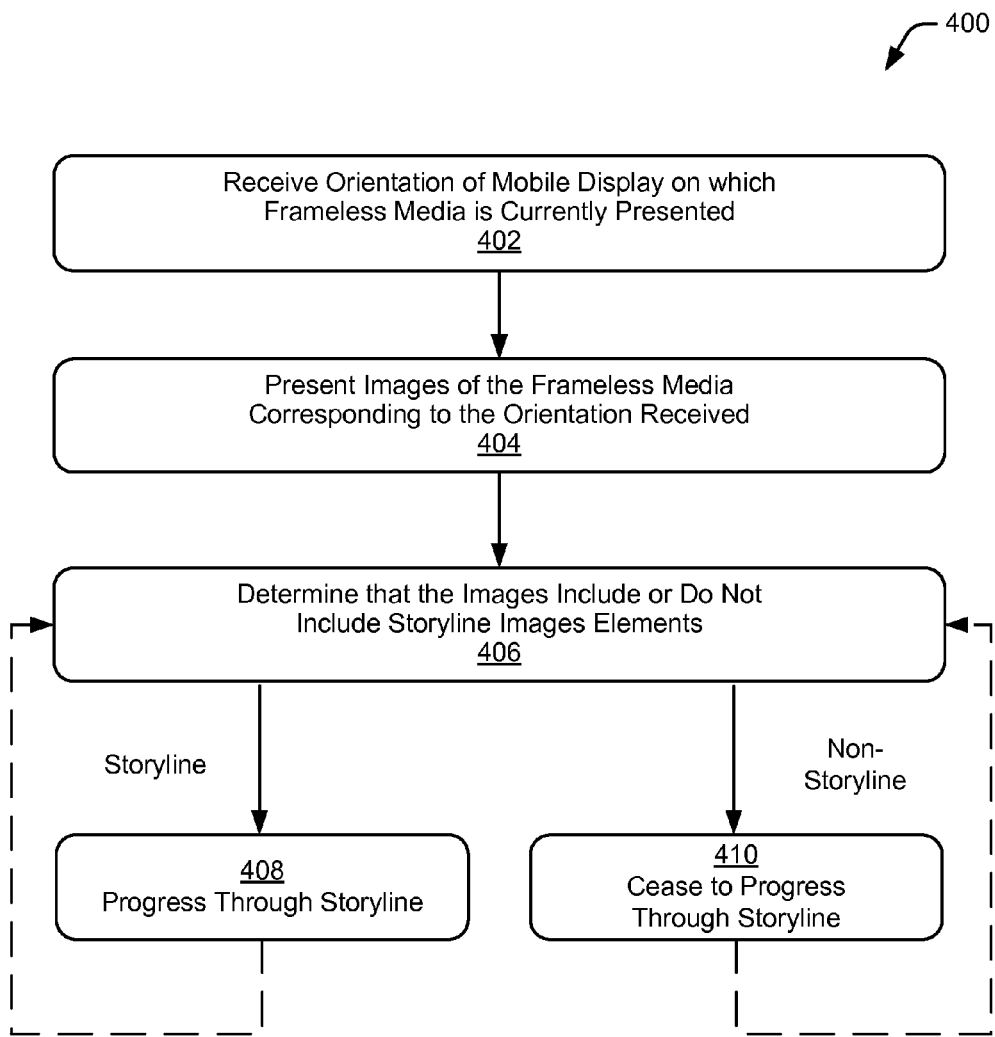
FIG. 4 illustrates example methods for view-driven consumption of frameless media.

FIG. 4 illustrates example methods 400 for view-driven consumption of frameless media. These methods enable a user, through a mobile display, to consume frameless media by orienting that display.

At 402, an orientation of a mobile display on which frameless media is currently presented is received. Frameless media can be presented in two or three dimensions whether or not the frameless media is represented as a cylindrical, spherical, or other three-dimensional environment. Thus, frameless-media module 210 can operate to provide stereoscopic images through a three-dimensional image projection display (e.g., stereoscopic eyeglasses or three-dimensional tablet displays with or without accompanying eyewear). While frameless media can be represented as a spherical environment this representation does not require that the images displayed are three dimensional themselves, as is shown in FIG. 3.

As noted above, a received orientation can move or tilt the display up, down, left, or right relative to the immediately previous orientation (e.g., through movement of a viewer's head or eyes over which stereoscopic eyeglass reside or turning or tilting of a smart phone or tablet computer's display). Orientations received, however, can maintain or provide similar orientations to that of immediately previous orientations as well.

At 404, images of the frameless media corresponding to the received orientation are presented. By way of example, consider FIG. 5, which shows user 108 of FIG. 1. Assume that frameless-media module 210 receives, from orienting mechanism 206, an indication that user 108 has oriented his or her mobile display 104 from bird 112 to trees 116 along orientation path 502. In response, frameless-media module 210 presents trees 116 on mobile display 104. This presentation of images can be seamless and continuous in mobile display 104. This is shown in mobile display 104 through presenting bird 112, then storm cloud 114, then trees 116 at continuous presentation 504.

At 406, the images of the frameless media are determined to include or not to include storyline image elements. As noted above these storyline image elements can be previously associated with an authored storyline included within the frameless media or determined during presentation.

Determining that the images include or do not include storyline image elements can be based on metadata for frameless media 106, comparisons with where the images shown map to portions or surfaces of a three-dimensional surface on which the frameless media is represented (e.g., sectors indicated as having storyline elements), or whether or not elements (e.g., characters, objects, and so forth) are likely to be part of storyline elements. Example manners in which to determine elements of a storyline include facial recognition systems to determine that a face is shown in the image, object recognition algorithms to determine that an object is in the image, relating faces or objects with audio (which is likely to indicate importance) or to similar faces and objects previously shown or in frameless media 106 for further viewing, and so forth.

Figure 6:
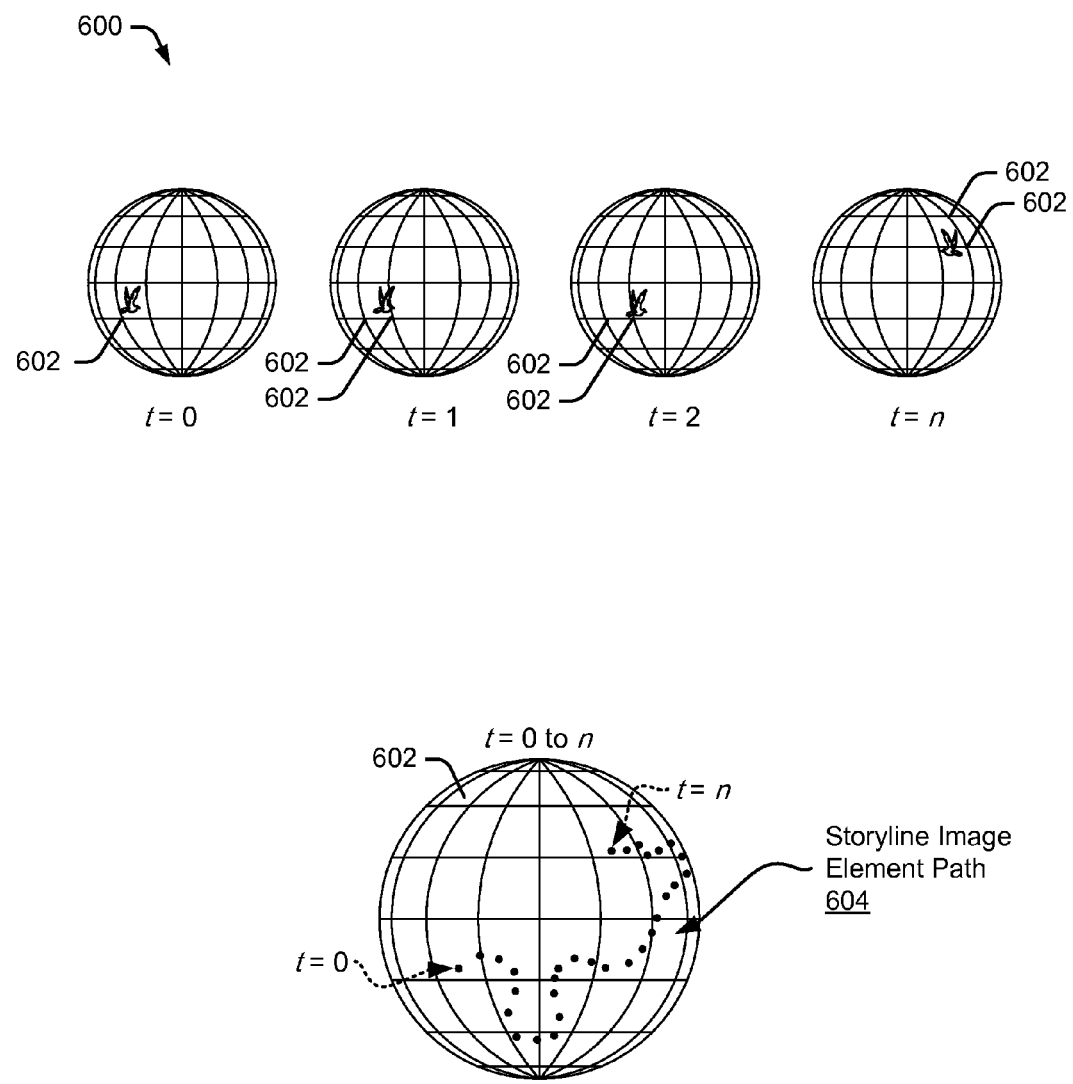
FIG. 6 illustrates a spherical media environment having sectors mapped to storyline image elements over a course of various periods of time.

By way of example, consider FIG. 6, which illustrates a spherical media environment 600 having sectors 602 mapped to storyline image elements over a course of various periods of time from t=0 to t=n, where t is time, 0 is an initial period, and n is a final period at which the storyline of the frameless media ends. These various periods of time can be for each image, sets of images, or scenes having many images. Assume, for example, that frameless media 106 includes a story about bird 112. For simplicity, assume that all of the story events following the storyline for this story include bird 112. Thus, all storyline image elements include bird 112 and any images that do not include bird 112 are non-storyline image elements.

In this simplistic case, at times=0, 1, 2, and n, bird 112 is shown in those sectors 602 mapped to bird 112, and thus each sector includes a storyline image element. The story, for example, can be about the bird flying, landing on the ground, catching a worm, taking off, flying around one of trees 116, landing in tree 116, feeding the worm to a chick the bird's nest, and taking off again (shown at t=n). This path is illustrated with storyline image element path 604 on spherical media environment 600.

Figure 5:
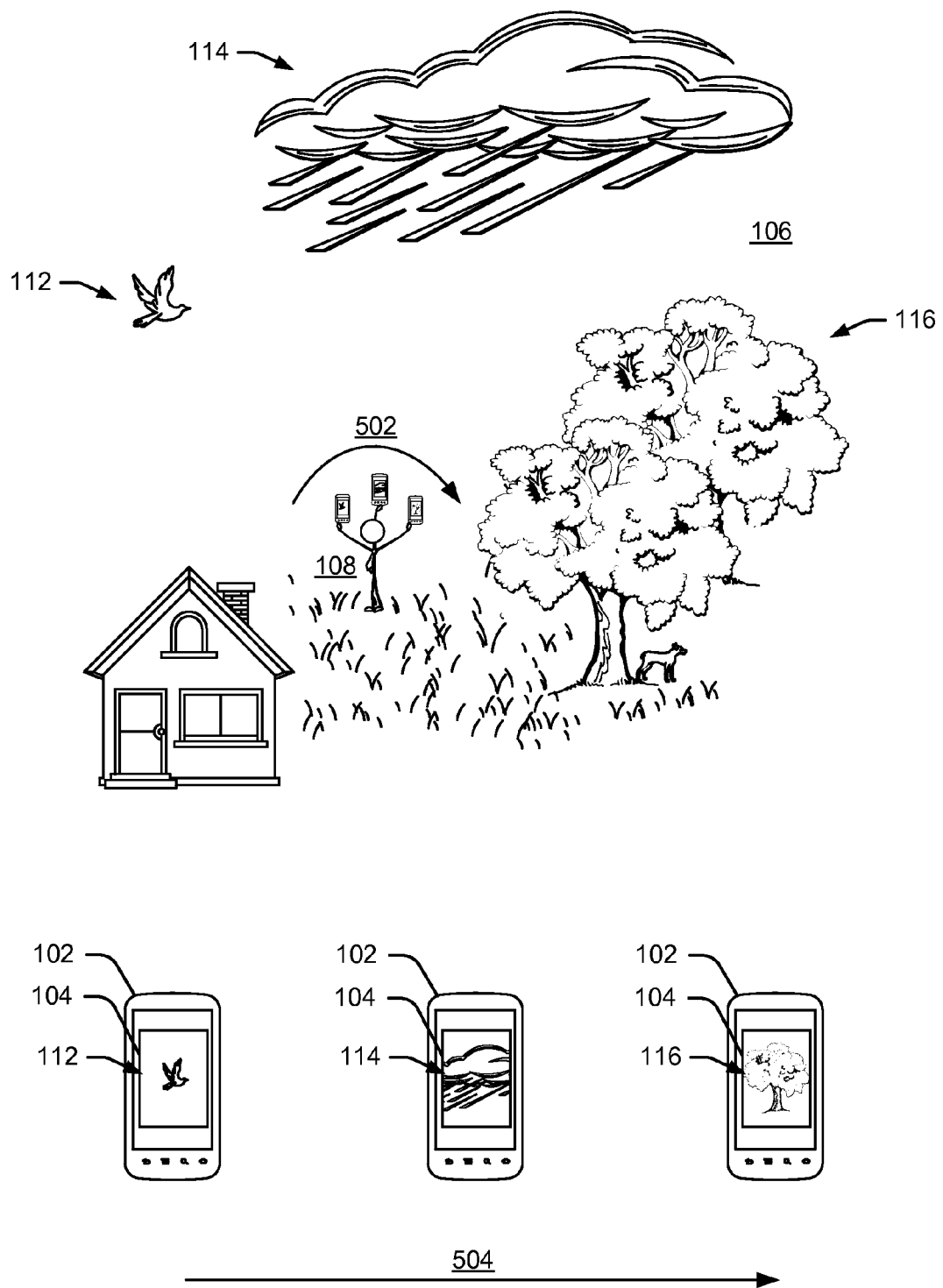
FIG. 5 illustrates orientations of a mobile device along an orientation path and images continuously presented on the mobile display during the orientation path.

Consider this story about the bird in relation to the example given in FIG. 5, where user 108 orients mobile display 104 along orientation path 502. In so doing, images shown start at, but cease to present, bird 112, and thus to follow authored storyline 212 for this example story about bird 112. Thus, at 406, frameless-media module 210 determines that storyline image elements are not presented on mobile display 104 when bird 112 ceases to be shown.

At 408, responsive to determining that the images include the storyline image elements, the images are presented on the mobile display effective to progress through the storyline. Thus, when images shown on mobile display 104 include bird 112, frameless-media module 210 progresses through the storyline. Presenting the storyline image elements effective to progress through the authored storyline may also progress other, non-storyline image elements of the frameless media.

For example, when the user is following bird 112, dog 118 of FIG. 1 may move (though the user may not see it), or lighting may strike and burn house 120, or other non-storyline portions of frameless media 106 may change. If frameless media 106 was a romantic comedy following a couple first in Paris, France and then in Singapore, for example, following the couple from Paris to their arrival in Singapore would therefore change non-storyline portions of frameless media 106 from a Paris setting to a Singapore setting.

At 410, responsive to determining that the images do not include the storyline image elements, progress through the storyline ceases to progress or, in other words, images can continue to be presented though their presentation is ineffective to progress the storyline. This ceasing to progress the authored storyline, however, enable users to fully engage with a story in frameless media without having to keep track of what is important for the story, or have to rewind, or otherwise have to manage the media. If the user wishes to view the storm cloud or the dog in FIG. 1, for example, the user may do so without having to manage the story or frameless media.

While not required, this ceasing is a way in which to enable users to engage with, and feel part of the world created through frameless media 106. Thus, a user can explore, by orienting their mobile display, through the world created by frameless media 106. Whether this exploration of the world involves zooming in to see a detail, watching what is not likely to be important to the story, like the wind moving through the trees, or zooming out to see larger portions of the world, frameless-media module 210 enables them to do so without losing track of the story. When user 108 as shown in FIG. 5, for example, moves back to bird 112 from trees 116, bird 112 will be shown roughly at or prior to when user 108 left bird 112.

Furthermore, frameless-media module 210 may show non-storyline image elements with movement as if frameless media 106 is progressing by looping or repeating images like trees 116 moving, or storm cloud 114 raining, and still return to bird 112 at or near its prior location and within the appropriate point in the series of elements of authored storyline 212.

Some portions of frameless media 106 may progress by viewing images not having storyline image elements. Thus, a user selecting to watch dog 118 of FIG. 1 may watch the dog play and then the dog lay down for a nap. This change in the dog's behavior can be caused by the user watching the dog, though it need not affect the story about the bird. This is one example of a subordinate story told by non-storyline image elements. They are, in effect, side stories that are not required to progress through the main story or through frameless media 106. Subordinate stories, however, can aid users in feeling engaged in the world created by frameless media 106.

As noted in part above, storyline elements may move within frameless media such that a story will not progress without active orienting by the user. Thus, if user 108 maintains one orientation in FIG. 5, the story will not progress as bird 112 will fly out of the view shown in that orientation.

The examples given are intended to show that a user may engage with a world enabled through frameless media. A user can fully view the environment created through orienting his or her device, though non-contemporaneously. A user cannot meaningfully view all of the world shown in one image, but by orienting his or her device can view the world at his or her own pace.

Example Device

Figure 7:
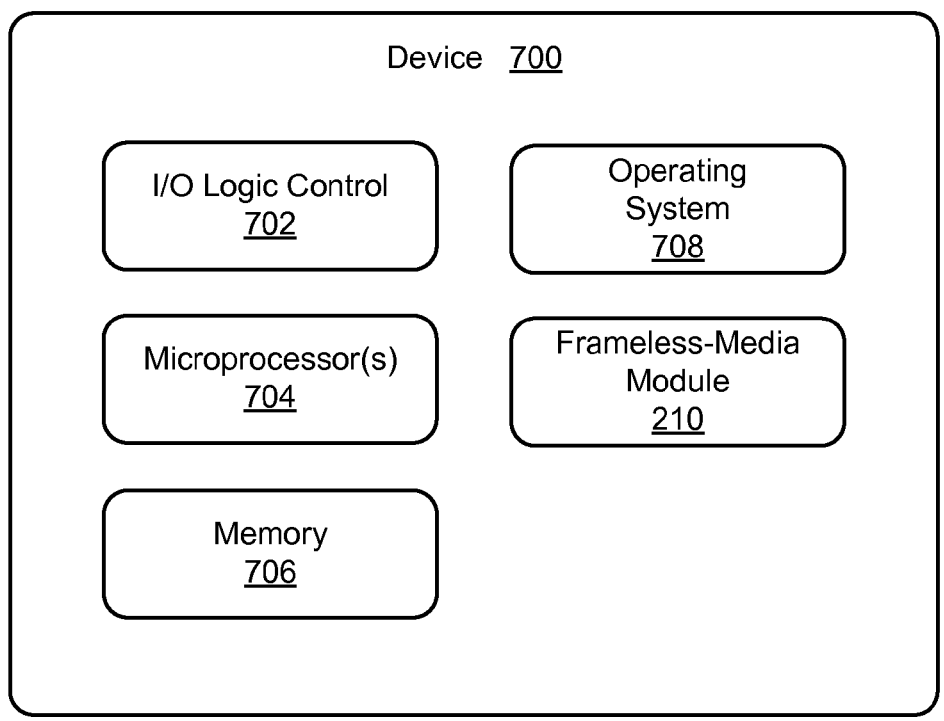
FIG. 7 illustrates a device having various components capable of implementing techniques of view-driven consumption of frameless media.

FIG. 7 illustrates various components of an example device 700 including frameless-media module 210 including or having access to other modules, these components implemented in hardware, firmware, and/or software and as described with reference to any of the previous FIGS. 1-6.

Example device 700 can be implemented in a fixed or mobile device being one or a combination of a media device, computing device (e.g., mobile device 102 of FIG. 1), video processing and/or rendering device, appliance device (e.g., a closed-and-sealed computing resource, such as some digital video recorders or global-positioning-satellite devices), gaming device, electronic device, vehicle, and/or workstation, so long as each is associated with a mobile display.

Example device 700 can be integrated with electronic circuitry, a microprocessor, memory, input-output (I/O) logic control, communication interfaces and components, other hardware, firmware, and/or software needed to run an entire device. Example device 700 can also include an integrated data bus (not shown) that couples the various components of the computing device for data communication between the components.

Example device 700 includes various components such as an input-output (I/O) logic control 702 (e.g., to include electronic circuitry) and microprocessor(s) 704 (e.g., microcontroller or digital signal processor). Example device 700 also includes a memory 706, which can be any type of random access memory (RAM), a low-latency nonvolatile memory (e.g., flash memory), read only memory (ROM), and/or other suitable electronic data storage.

Example device 700 can also include various firmware and/or software, such as an operating system 708, which can be computer-executable instructions maintained by memory 706 and executed by microprocessor 704. Example device 700 can also include other various communication interfaces and components, wireless LAN (WLAN) or wireless PAN (WPAN) components, other hardware, firmware, and/or software.

Other examples capabilities and functions of these components are described with reference to elements shown in FIGS. 1 and 2, along with illustrations of FIGS. 3, 5, and 6. These components, either independently or in combination with modules or entities described herein, can be implemented as computer-executable instructions maintained by memory 706 and executed by microprocessor 704 to implement various embodiments and/or features described herein. These components may also be provided integral with other components of device 700, such as integrated with frameless-media module 210. Alternatively or additionally, any or all of these components can be implemented as hardware, firmware, fixed logic circuitry, or any combination thereof that is implemented in connection with the I/O logic control 702 and/or other signal processing and control circuits of example device 700. Furthermore, some of these components may act separate from device 700, such as a remote (e.g., cloud-based) component performing services for frameless-media module 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving an orientation of a mobile display on which frameless media is currently presented, the orientation different from an immediately previous orientation of the mobile display, the frameless media capable of telling a story, the story including an authored series of story events representing an authored storyline of the story;
   presenting, in response to the received orientation, images of the frameless media corresponding to the received orientation;
   determining that the images of the frameless media corresponding to the received orientation include or do not include storyline image elements, the storyline image elements presenting at least a portion of one story event of the authored series of story events included within the frameless media;
   responsive to determining that the images include the storyline image elements, presenting the storyline image elements on the mobile display effective to progress through the authored series of story events; and
   responsive to determining that the images do not include the storyline image elements, ceasing to progress through the authored series of story events.

2. The method as recited in claim 1, wherein the received orientation indicates one of a moving or tilting the display up, down, left, or right relative to the immediately previous orientation.

3. The method as recited in claim 1, wherein the frameless media is a spherical media environment having no frame in a horizontal or vertical direction and enabling 360-degree viewing in the horizontal direction and the vertical direction from a point at or near a center of the spherical media environment to an interior surface of the spherical media environment on which the frameless media resides.

4. The method as recited in claim 1, wherein the step of determining that the images of the frameless media corresponding to the received orientation include or do not include storyline image elements includes mapping the images to portions of a three-dimensional surface on which the frameless media is represented.

5. The method as recited in claim 1, wherein the frameless media is capable of being presented in three dimensions and the mobile display presents the frameless media in three dimensions within each of the images.

6. The method as recited in claim 5, wherein the mobile display includes stereoscopic eyeglasses and the received orientations are received through movement of a viewer's head or eyes on or over which the stereoscopic eyeglasses reside.

7. The method as recited in claim 1, wherein the presenting images presents the images in two dimensions and the frameless media is capable of being fully viewed non-contemporaneously through the images in two dimensions.

8. The method as recited in claim 1, wherein the frameless media is a live-action movie filmed with a 360-degree perspective in a horizontal direction.

9. The method as recited in claim 1, wherein the frameless media is an animated motion picture having images viewable from a 360-degree perspective in a horizontal direction and a 270-degree or greater perspective in a vertical direction.

10. The method as recited in claim 1, wherein the determining that the images of the frameless media include or do not include storyline image elements is based on metadata for the frameless media.

11. The method as recited in claim 1, wherein the determining that the images of the frameless media include or do not include storyline image elements is based on the images mapping to sectors identified as having storyline image elements.

12. The method as recited in claim 1, wherein the determining that the images of the frameless media include or do not include storyline image elements is based on facial recognition or object recognition.

13. The method as recited in claim 1, wherein the determining that the images do not include the storyline image elements includes the images having non-storyline image elements, and the method further comprises presenting the non-storyline image elements.

14. The method as recited in claim 13, wherein the non-storyline image elements are presented with movement.

15. The method as recited in claim 13, wherein the story further includes a subordinate story event different than the authored series of story events and wherein the presenting of the non-storyline image elements includes presenting the non-storyline image elements on the mobile display effective to progress through the subordinate story event.

16. The method as recited in claim 1, further comprising:
   receiving another orientation after ceasing to progress through the authored series of story events;
   determining that the images of the frameless media corresponding to the another received orientation includes the storyline image elements; and
   resuming the progression through the authored series of story events from a point at which the progression through the authored series of story events ceased.

17. An apparatus comprising:
   a mobile display;
   orientation sensors associated with the mobile display;
   one or more computer processors;
   one or more computer-readable storage devices comprising processor-executable instructions that, responsive to execution by the one or more computer processors, perform a method comprising:

receiving real-time orientation data from the orientation sensors, the orientation data indicating orientations of the mobile display;

in real-time and responsive to the real-time orientation data indicating orientations of the mobile display, presenting images of frameless media corresponding to the orientations, the frameless media having no frame in at least one direction, the frameless media capable of telling a story, the story including an authored series of story events representing an authored storyline of the story; and when the presented images include storyline image elements representing at least a portion of one story event of the authored series of story events of the frameless media, presenting the storyline image elements at or near a point in the one story event, the one story event previously presented prior to presenting images that do not include the storyline image elements.

18. The apparatus of claim 17, further comprising mapping the images to sectors of a three-dimensional surface corresponding to the frameless media, the mapping indicating, based on the images being within a portion of the sectors, that the images include the storyline image elements.

19. The apparatus of claim 17, wherein the presenting of the storyline image elements at or near the point in the one story event includes repeating the one story event.

20. The apparatus of claim 17, wherein the presenting of the storyline image elements at or near the point in the one story event resumes the progression through the authored series of story events.

* * * * *